Figure 1:
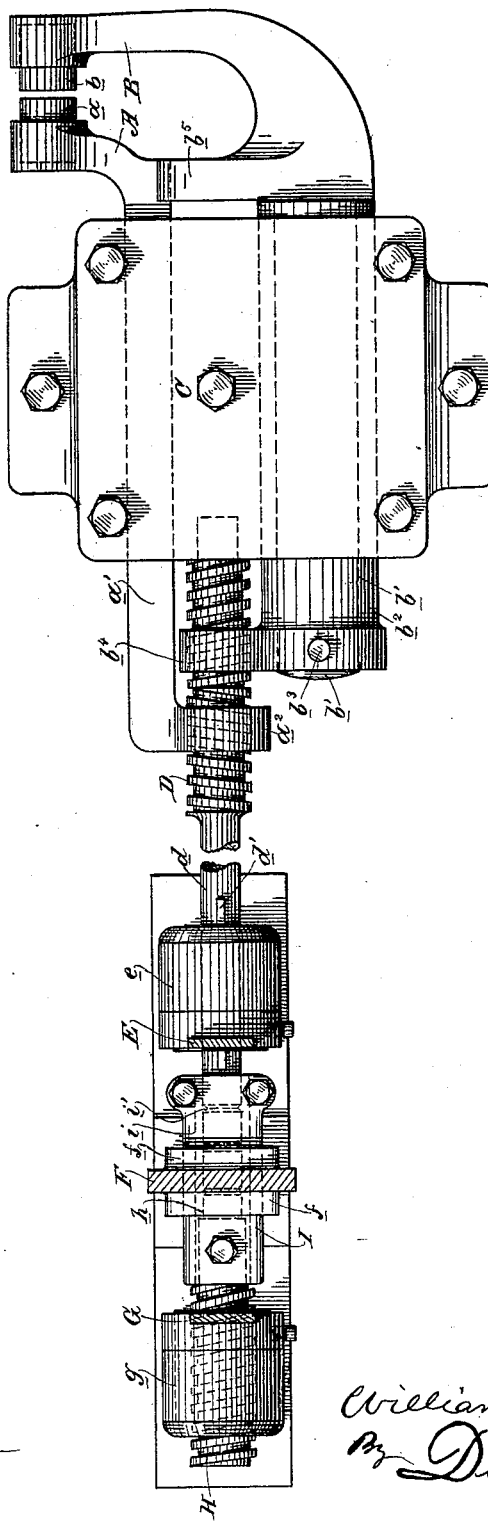

(No Model.) 2 Sheets—Sheet 1.

W. A. CAMPBELL
SAW GUIDE.

No. 449,844. Patented Apr. 7, 1891.

Witnesses,
H. E. Lee.

Inventor,
William A. Campbell
By Duvey & Co.
atty (No Model.) 2 Sheets—Sheet 2.
W. A. CAMPBELL.
SAW GUIDE.
No. 449,844. Patented Apr. 7, 1891.
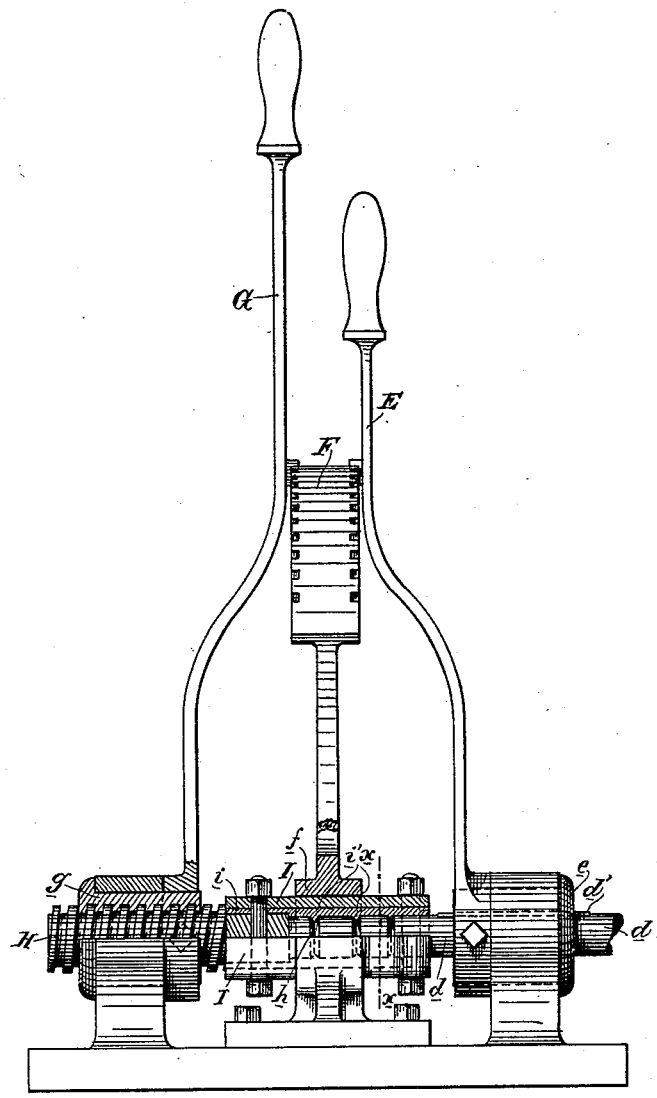
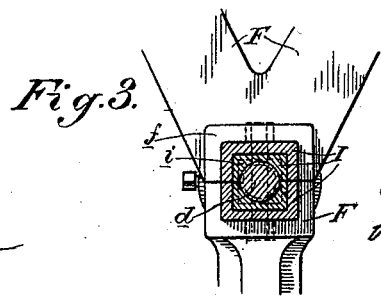
Witnesses,
Inventor
William A. Campbell
By Dewey & Co.
attys

UNITED STATES PATENT OFFICE.

WILLIAM A. CAMPBELL, OF PORTLAND, OREGON.

SAW-GUIDE.

SPECIFICATION forming part of Letters Patent No. 449,844, dated April 7, 1891.

Application filed August 18, 1890. Serial No. 362,316. (No model.)

*To all whom it may concern:*

Be it known that I, WILLIAM A. CAMPBELL, a citizen of the United States, residing at Portland, Multnomah county, State of Oregon, have invented an Improvement in Saw-Guides; and I hereby declare the following to be a full, clear, and exact description of the same.

My invention relates to saw-guides; and it consists in the novel constructions and combinations of parts hereinafter fully described, and specifically pointed out in the claims.

The object of my invention is to provide a simple and effective saw-guide in which the opposing guides are readily adjustable to graduate the space between them, both guides being also movable in the same direction in order to throw the saw out of or in the cut, and the outer guide being adapted to be readily moved out of the way to change the saws.

Referring to the accompanying drawings for a more complete explanation of my invention, Figure 1 is a plan of my guide, the quadrant or rack being removed and the two levers shown in horizontal section. Fig. 2 is an elevation of the quadrant and levers. Fig. 3 is a cross-section on the line $x\ x$ of Fig. 2.

A is the inner and B is the outer guide, each having the guide-pins $a$ and $b$ in their faces, between which the space is formed for the saw. The stem $a'$ of the inner guide extends and slides through a fixed box or bearing C, and its rear end is bent to form an arm $a^2$, which is threaded upon the operating-screw, as will be presently described. The stem $b'$ of the outer guide likewise extends and slides through the box C, and around it is fitted a sleeve $b^2$, the rear end of which is connected with said stem by a pin $b^3$, and said rear end has an inwardly-extending arm $b^4$, which is threaded upon the operating-screw.

D is the operating-screw, one portion of which is threaded in one direction and another portion threaded in the reverse direction, and upon these separate portions the arms $a^2$ and $b^4$ are seated. Now it will be seen that by rotating said screw the saw-guides A and B are moved simultaneously in opposite directions, so as to increase or decrease the space for the saw between the guide-pins. By taking out the pin $b^3$, which holds the sleeve $b^2$ and the stem $b'$ of the outer guide together, said outer guide may be turned downwardly so as to clear the saw and allow it to be readily removed and another substituted. The stem $b'$ of the outer guide B has a bearing-arm $b^5$ near its forward portion, which serves as a guide on the stem $a'$ of guide A, and when a saw has to be removed, the pin $b^3$ being taken out, the outer guide is drawn forwardly far enough to cause the bearing-arm $b^5$ to be removed from the stem $a'$ of the inner guide, whereupon said outer guide may be turned down, as heretofore described.

In order to turn the operating-screw, there is the graduating-lever E, the upper end of which is adapted to engage the quadrant or rack F. The lower end of this lever has or is connected with a sleeve $e$, which is mounted in a suitable bearing or box, and is seated upon the shaft $d$ of screw D by means of a feather or spline $d'$ on said shaft, so that by moving the lever E the screw D is rotated. Now to move both guides bodily in the same direction there is the lever G, the upper end of which is adapted to engage the other side of the quadrant or rack F. The lower end of this lever has or is connected with a sleeve $g$, mounted in a suitable boxing and internally threaded, said sleeve being seated upon the threaded end of a screw-shaft H, the inner end of which is square and fits in the square end of a coupling-sleeve $i$, the other end of which is round interiorly and fits over and engages by means of annular tongues and grooves at $i'$ the end of shaft $d$, which meets the end of shaft H at $h$. The coupling-sleeve $i$ is square exteriorly and fits within the square boxing I, which is mounted and adapted to slide within the square-socketed base $f$ of the quadrant F. This connection is to form a swiveled joint between the screw-shaft H and the shaft $d$ of screw D, whereby the latter can turn without affecting the former, and yet be moved longitudinally by the longitudinal movement of screw-shaft H. Therefore by operating lever G screw-shaft H is moved longitudinally, moving the shaft $d$ likewise, though without turning it, the coupling-sleeve and boxing I both sliding with said shafts. The shaft d thus moves longitudinally on its spline through the sleeve of lever E, and thereby moves bodily the two guides A and B. It will readily be observed that this guide is changeable to the right or left.

Having thus described my invention, what I claim as new, and desire to secure by Letters Patent, is—

1. In a saw-guide, the combination of the opposing guides A and B, the reverse-threaded screw for operating the said guides in opposite directions, and the lever for operating the screw, substantially as herein described.

2. In a saw-guide, the combination of the opposing guides A and B, having the sliding stems, the threaded arms thereof, the reverse-threaded screw upon which said arms are seated, and the lever for operating the screw, substantially as herein described.

3. In a saw-guide, the combination of the opposing guides A and B, the longitudinally-movable reverse-threaded screw connected with said guides, whereby they are moved, a lever connected with said screw for turning it, a shaft operating against the screw for moving it longitudinally, and a lever for moving said shaft, substantially as herein described.

4. In a saw-guide, the combination of the opposing guides A and B, the longitudinally-movable reverse-threaded screw connected with said guides for operating them, the lever E for operating said screw, the screw-shaft swiveled to the inner end of the operating-screw, and the lever G and threaded sleeve for operating the screw-shaft, substantially as herein described.

5. In a saw-guide, the combination of the opposing guides A and B, having the sliding stems with threaded arms, the sliding reverse-threaded screw upon which said arms are seated, the graduating-lever having the sleeve connected with said screw by a spline or feather, the screw-shaft H, operating against the end of the sliding screw, and the lever G, having a threaded sleeve seated upon the screw-shaft, substantially as herein described.

6. In a saw-guide, the guide B, having a stem, in combination with the sleeve fitted around said stem, the threaded arm of said sleeve, the operating-screw on which said arm is seated, and a removable connection between the sleeve and the stem of the guide, whereby said guide may be held and when released may be turned out of the way, substantially as herein described.

7. In a saw-guide, the combination of the opposing guides A and B, having the sliding stems, the sleeve fitted about the stem of the guide B, the threaded arms of the stem of the guide A and of said sleeve, the reverse-threaded screw upon which said arms are seated, and the removable pin connecting the sleeve with the stem of the guide B, substantially as herein described.

8. In a saw-guide, the combination of the opposing guides A and B, having the stems $a'$ and $b'$, the bearing-arm $b^5$ of the stem $b'$, the sleeve about said stem, the threaded arms of the stem $a'$ and of said sleeve, the reverse-threaded screw upon which said arms are seated, and the removable pin connecting the sleeve with the stem $b'$, substantially as herein described.

9. A saw-guide consisting of the combination of the opposing guides A and B, having sliding stems, the sleeve fitted about the stem of guide B, the removable pin connecting the sleeve with said stem, the threaded arms of the stem of guide A and of the sleeve, the sliding reverse-threaded screw upon which said arms are seated, the lever E, with sleeve fitted to said screw by a spline or feather, the screw-shaft operating against said screw, the lever G, with threaded sleeve seated on said screw-shaft, and the rack F for holding said levers, substantially as herein described.

In witness whereof I have hereunto set my hand.

WILLIAM A. CAMPBELL.

Witnesses:
F. A. GARDNER,
C. S. WHEATON.